(12) United States Patent
Pfau

(10) Patent No.: US 8,490,827 B2
(45) Date of Patent: Jul. 23, 2013

(54) WORK PLATFORM ASSEMBLY FOR A CONTAINER

(75) Inventor: Dieter Pfau, Elkenroth (DE)

(73) Assignee: WEW Westerwalder Eisenwerk GmbH, Weitefeld (DE)

( * ) Notice: Subject to any disclaimer, the term of this patent is extended or adjusted under 35 U.S.C. 154(b) by 396 days.

(21) Appl. No.: 12/669,720

(22) PCT Filed: May 28, 2008

(86) PCT No.: PCT/EP2008/004251
§ 371 (c)(1),
(2), (4) Date: Jan. 19, 2010

(87) PCT Pub. No.: WO2009/010124
PCT Pub. Date: Jan. 22, 2009

(65) Prior Publication Data
US 2010/0193532 A1 Aug. 5, 2010

(30) Foreign Application Priority Data

Jul. 19, 2007 (DE) ..................... 20 2007 010 089 U

(51) Int. Cl.
*B65D 90/00* (2006.01)
(52) U.S. Cl.
USPC ............... 220/720; 220/694; 182/82; 182/84; 49/137; 414/557; 414/809; 296/57.1
(58) Field of Classification Search
USPC . 220/694, 720; 182/82, 84; 49/137; 414/557; 414/809; 296/57.1
See application file for complete search history.

(56) References Cited

U.S. PATENT DOCUMENTS

| 1,740,000 | A | * | 12/1929 | Andrews et al. | 220/1.5 |
| 4,021,071 | A | * | 5/1977 | Norman | 296/62 |
| 5,722,643 | A | * | 3/1998 | Chamberlin et al. | 267/120 |
| 6,431,093 | B1 | * | 8/2002 | Hansen | 108/135 |

FOREIGN PATENT DOCUMENTS

| DE | 231550 A1 | 1/1986 |
| DE | 295 06 845 | 6/1995 |
| DE | 295 06 846 | 8/1995 |
| EP | 1 541 501 | 6/2005 |
| EP | 1564069 | 8/2005 |
| EP | 1 688 370 | 8/2006 |
| FR | 2 467 268 | 4/1981 |
| JP | S55-113643 U | 8/1980 |
| JP | H05-058163 A | 3/1993 |

(Continued)

OTHER PUBLICATIONS

International Preliminary Report on Patentability dated Apr. 15, 2010 for Application No. PCT/EP2008/004251.

(Continued)

*Primary Examiner* — Anthony Stashick
*Assistant Examiner* — Elizabeth Volz
(74) *Attorney, Agent, or Firm* — Frost Brown Todd LLC

(57) ABSTRACT

The present invention relates to a work platform assembly (5) for a container (1) with an adjustable work platform (6), which can be adjusted between a horizontal operational position and a rest position. The work platform (5) is configured and positioned such that in its rest position it extends completely within the external contours of the container assembly (1), and in its operational position it forms a horizontal platform. The invention also relates to a container assembly (1) with such a work platform assembly (5).

14 Claims, 6 Drawing Sheets

FOREIGN PATENT DOCUMENTS

| | | |
|---|---|---|
| JP | H08-230719 A | 9/1996 |
| JP | H09-136668 A | 5/1997 |
| JP | H11-005448 A | 1/1999 |
| JP | 3060881 U | 9/1999 |
| JP | 2000-038080 A | 2/2000 |
| JP | 2001-180535 A | 7/2001 |
| JP | 2004-323007 A | 11/2004 |
| WO | WO 2005/014411 | 2/2005 |

OTHER PUBLICATIONS

International Search Report dated Sep. 19, 2008 for Application No. PCT/EP2008/004251.

Abstract of European Application No. EP 1564069 filed Aug. 17, 2005.

Japanese Office Action dated Jul. 3, 2012 for Application No. JP 2010-516379.

Abstract and English Machine Translation of Japanese Patent JP H05-058163 A.

Abstract and English Machine Translation of Japanese Patent JP H08-230719 A.

Abstract and English Machine Translation of Japanese Patent JP H09-136668 A.

Abstract and English Machine Translation of Japanese Patent JP H11-005448 A.

Abstract and English Machine Translation of Japanese Patent JP 2000-038080 A.

Abstract and English Machine Translation of Japanese Patent JP 2001-180535 A.

Abstract and English Machine Translation of Japanese Patent JP 2004-323007 A.

English Machine Translation of Japanese Patent JP 3060881 U.

* cited by examiner

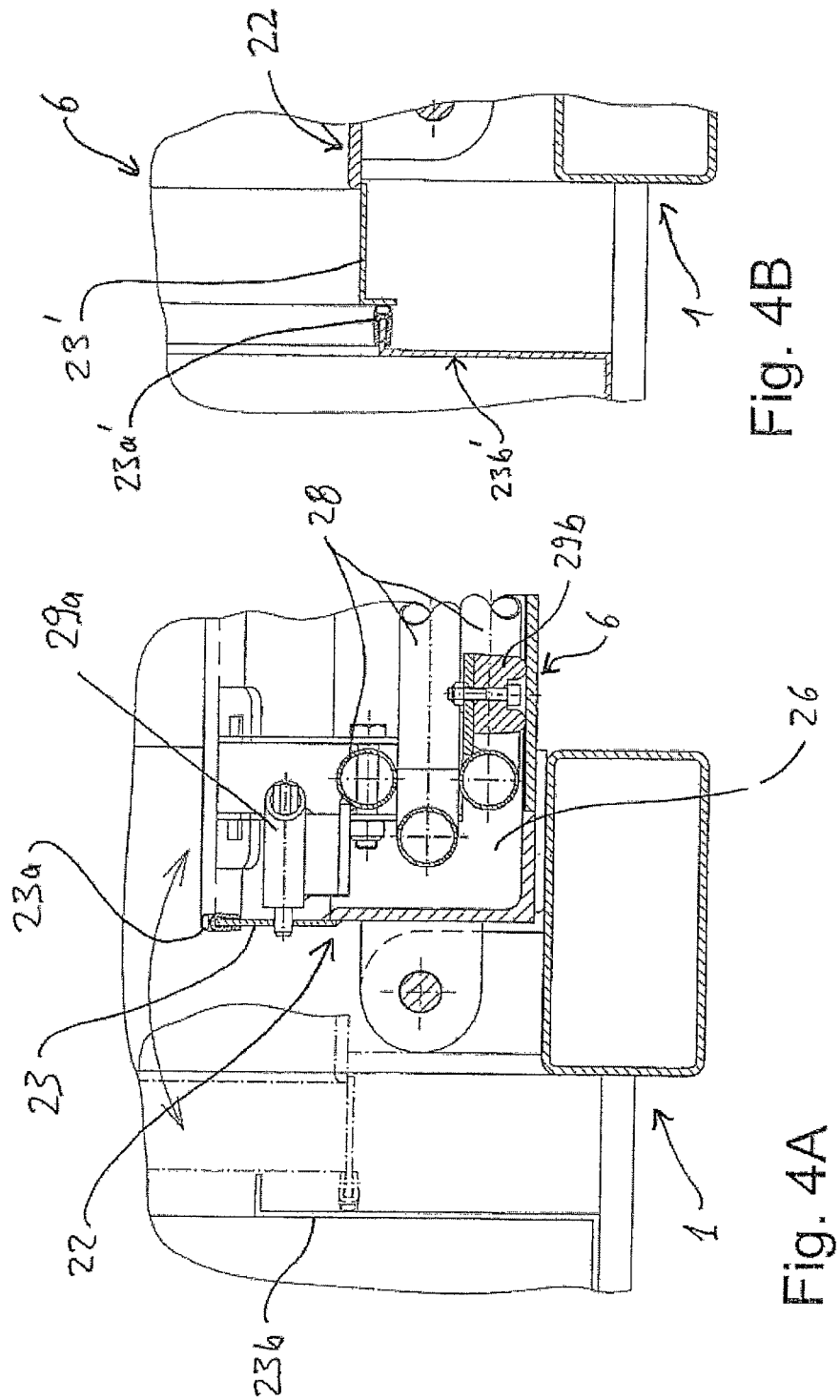

WORK PLATFORM ASSEMBLY FOR A CONTAINER

BACKGROUND OF THE INVENTION

The present invention relates to a work platform assembly for a container, with an adjustable work platform which can be adjusted between a horizontal operational position and a rest position.

Adjustable work platforms are known in the commercial truck industry as so-called liftgates. Liftgates are generally located in the vicinity of a cargo opening or loading access to a cargo area, for example at the rear end of a truck body. Such liftgates—as the name implies—are used for loading and unloading vehicles of this type. In their operational position, they generally form a horizontal platform, which can be moved up and down between the level of the cargo hold and the ground. In their rest position, such liftgates are located outside of such a truck body. They are either folded directly against the opening area or stowed beneath the truck body in the area of the chassis. Liftgates are attached to the vehicle.

In what follows, the term "container" refers to empty and filled transloadable transport containers, which can be transloaded in their full or empty state, with standardized external dimensions (e.g., ISO dimensions) and using normal transloading elements (e.g., ISO corner fittings, i.e., they can be transloaded between different modes of transport (rail, road, sea). The above-described liftgates are not arranged on containers.

Directional indicators, such as right, left, above, below, front and rear refer to a container positioned on a road vehicle, from the point of view of the driver.

In addition to so-called box containers for general cargo, there are also so-called tank containers or containerized transport systems for liquids, which comprise a liquid tank and/or a mechanical equipment space. In a mechanical equipment space of this type, a wide variety of instruments and devices can be housed. One container system of this type is known from EP 1 688 370 A1, for example. Such systems are also frequently loaded and operated on carrier vehicles, in other words on trucks or tractor trailers. Control elements for the mechanical equipment then are frequently situated so high that they cannot be accessed without accessory systems. Liftgates are not ordinarily provided on such vehicles. Because such vehicles also are not ordinarily equipped with safety devices to protect against falls (guard rails), they are also unsuitable for use as work platforms for controlling the instruments and devices of containers located on the vehicles. There are also folding work platforms, which are positioned at the rear end of transport units. Such work platforms are attached to transport units like a backpack, extending beyond their external contours. They serve to create a level access/control area for instruments or mechanical equipment in difficult terrain (uneven, muddy, etc.).

From EP 1 541 501 A1, a work platform is known, which is configured and arranged such that in its rest position (stowed) it extends completely within the external contours of the container assembly, and in its operational position (extended) it forms a horizontal platform (which then does not need to extend within the external contours). A work platform assembly of this type expands the functional range of such containers. For instance, they can be used on vehicles in which the units and operating elements are accessible above the work platform in its operational position, without requiring additional external ladder elements, scaffolding, or similar structures. Because the work platform in its rest position is located within the external contours of the container, the container can be transloaded and transported without restrictions and without special measures.

However, stowable/extendable work platforms have the disadvantage that they require a certain amount of ground space and that, under certain circumstances, the stowing mechanism requires complicated sealing mechanisms, especially when combined with doors that open toward the surface of the work platform. Doors of this type generally lead to a mechanical equipment space or to the interior of the container.

The object is therefore to provide an improved work platform assembly, which can be used in combination with a container, especially with a tank container having a mechanical equipment space, without negatively affecting its compatibility in multimodal transport.

BRIEF SUMMARY OF THE INVENTION

According to the invention, the work platform is configured to be pivotable and to extend vertically in its rest position, thereby allowing it to seal off a corresponding wall area on the container. In other words, the work platform can serve at the same time as a wall element, or can be configured as a door that seals off an access opening.

According to Claim 2, the work platform is equipped with an edge area, which forms an edge at least part of the way around the passable work space—in the operational position, the platform surface—, so that this edge area defines a holding area in which an erectable safety device can be provided. Safety devices of this type are required when the work platform is at a certain height. For example, when the container is on a vehicle, the platform, if it is aligned approximately with the underside of the container, is at a height of approx. 140-160 cm. Working areas at this height must be secured with guard rails, according to generally recognized safety regulations. The edge area clearly defines the corresponding holding area, so that in the construction of the container and in the positioning of potential units and other elements, this available space can easily be taken into account so as to prevent the work platform and safety devices located there from colliding with other components (instruments, mechanical equipment) on the container when the work platform is in its rest position (folded up). Because this area is then also inaccessible from the outside, mishandling and damage are avoided. According to Claim 3, the safety device can be embodied as a folding guard rail element, which can be erected when the work platform is in its operational position and forms a horizontal platform, which can then be secured by one or more folding guard rail elements.

The further improvement according to Claim 4 provides an additional function for the edge area, in which it can serve as a sealing element. In this case, either a flexible sealing element can be provided along the rim zone of the edge area, which then rests against a corresponding opposite surface on the container, or the rim zone can itself be embodied as a sealing surface, which is sealed, for example, against a flexible seal on the container itself.

According to Claim 5, an additional holding area can be formed on the work platform, which holds a ladder and is accessible from the outside when the work platform is in its rest position. This area also extends within the external contours of the container assembly. With a configuration of this type, first a ladder can be removed or swiveled outward from this holding area, and then the work platform can be moved out of its rest position into its operational position. The horizontal platform, which is now available, can be accessed by climbing the ladder, and additional safety devices may optionally be attached and/or erected there. In this manner, a user-friendly and safe handling system is ensured.

According to Claim 6, an additional flap element is provided, which can be pivoted back and forth between a rest position and an operational position, similar to the work platform, wherein the flap element in its rest position is adjacent to the work platform, and closes off another area, and in its operational position forms a horizontally extending roof element over the work platform or the platform. This allows the platform itself to be smaller and therefore lighter in structure. At the same time, however, a large access opening can be created, and the working area can also be protected from the effects of weather.

According to Claim 7, spring elements, especially pneumatic springs, can facilitate and/or secure the handling and fastening of the work platform and/or the roof element.

Claim 8 relates to a container assembly, especially a tank container with a wall area, which comprises a work platform assembly of the invention. According to Claim 10, this wall area is correspondingly arranged at the rear or the front end surface of the container.

BRIEF DESCRIPTION OF THE DRAWING

An exemplary embodiment of the present invention will be specified in reference to the figures. The drawings show FIG. 1A a side view of a container on a vehicle, with a work platform according to the invention, FIG. 1B a view from the rear of the vehicle and the container of FIG. 1A, FIG. 2A a side view of the container shown in FIGS. 1A and 1B, with the work platform folded out, FIG. 2B a view of the assembly shown in FIG. 2A, from the top, FIG. 2C a view from the rear of the assembly shown in FIG. 2A, with the ladder attached, FIG. 3A a side view with the work platform folded out, the flap element folded out, the safety device erected and the ladder attached, FIG. 3B a view from the top of the assembly depicted in FIG. 3A, FIG. 3C a view from the rear of the assembly depicted in FIG. 3A, FIG. 4A a sectional view of Area A from FIG. 2A, FIG. 4B an alternative sealing configuration in the representation according to FIG. 4A, FIG. 5A a view from the rear, corresponding to FIG. 1B, with an alternative work platform with an additional holding area and a ladder arranged therein, and FIG. 5B the assembly of FIG. 5A with the work platform folded out and the ladder folded out.

DETAILED DESCRIPTION OF THE INVENTION

Figure 1A:
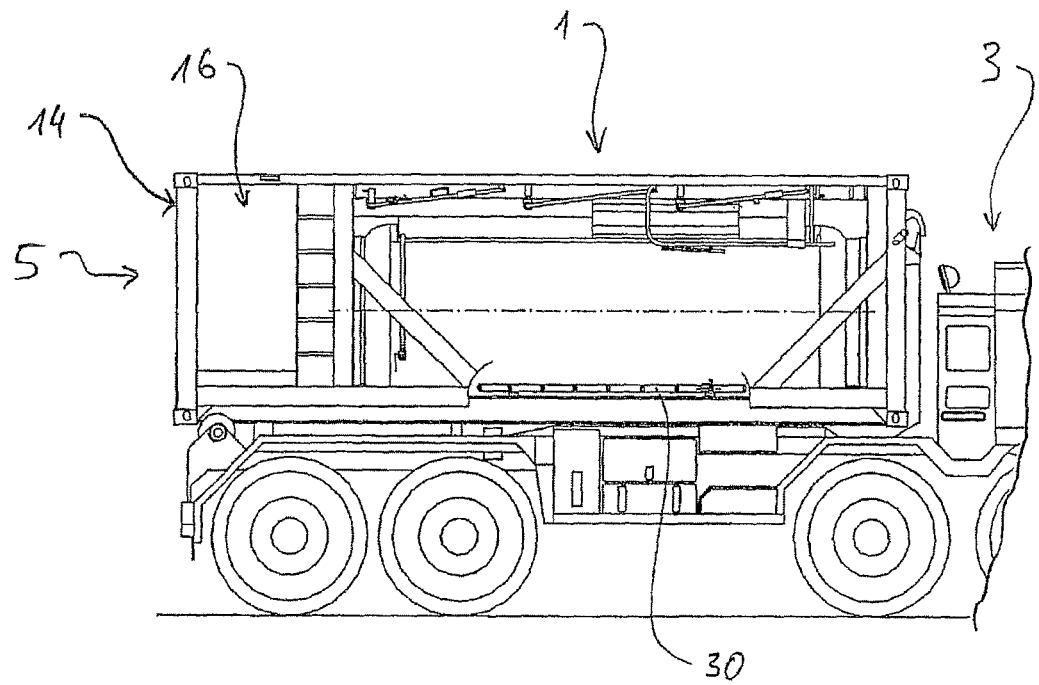
Figure 1B:
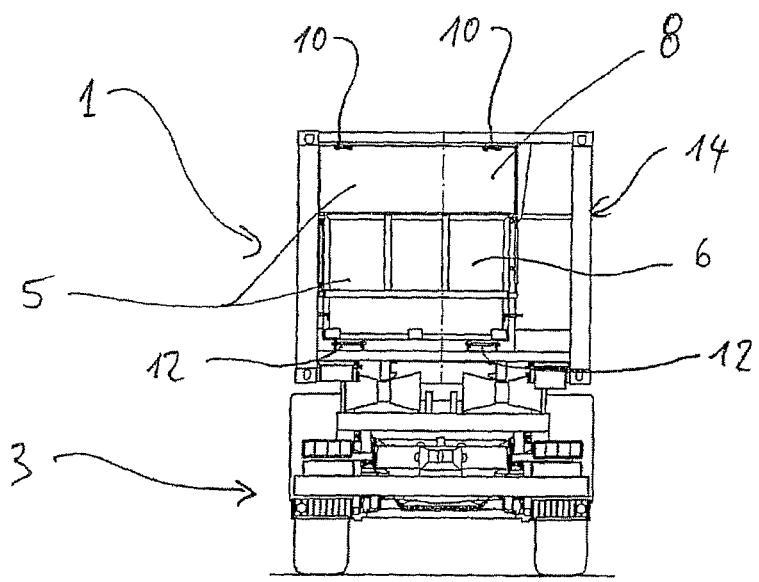

FIGS. 1A and 1B show a container 1 on a vehicle 3 (only partially shown in FIG. 1A). The work platform assembly 5 is positioned at the rear end of the container.

FIG. 1B (view from the rear) shows the work platform 6 and the flap element 8 arranged above this. Work platform 6 and flap element 8 are both in their rest positions. Both are attached to the container frame 14 via hinge arrangements 10 and 12. In this position, the work platform 6 and the flap 8 seal off a mechanical equipment space 16, which is situated at the rear end of the container 1.

FIG. 1A shows that both the work platform 6 and the flap element 8 are located completely within the external contours of the container 1 when in their rest positions.

Figure 2A:
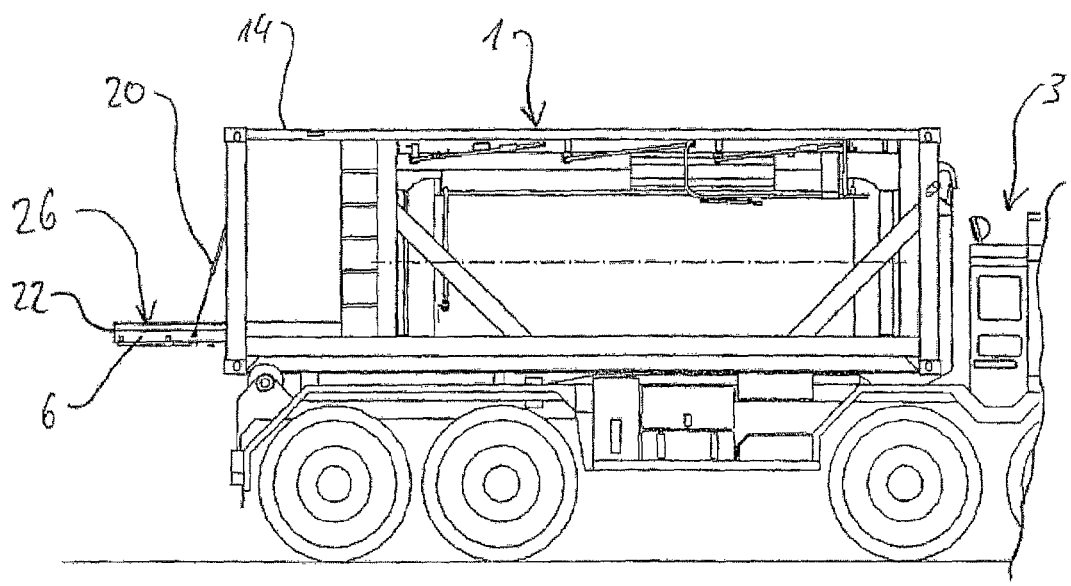
Figure 2B:
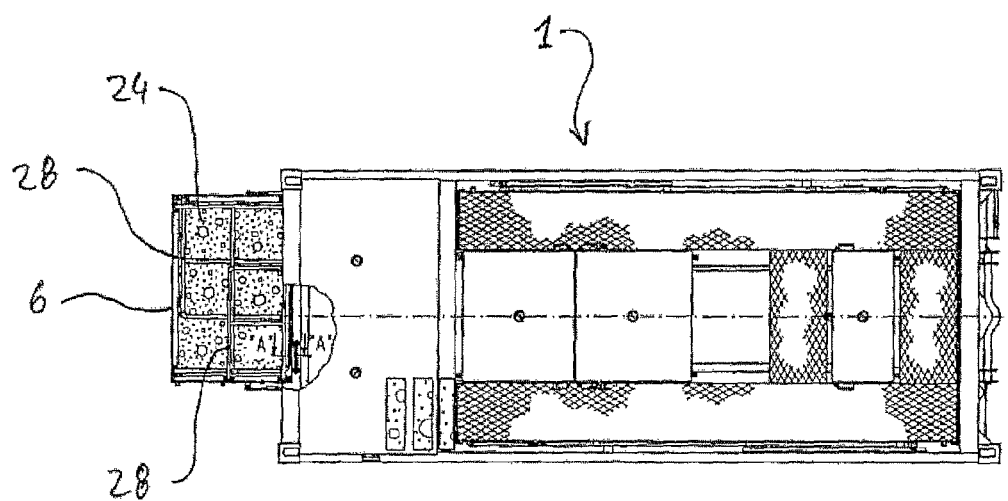
Figure 2C:
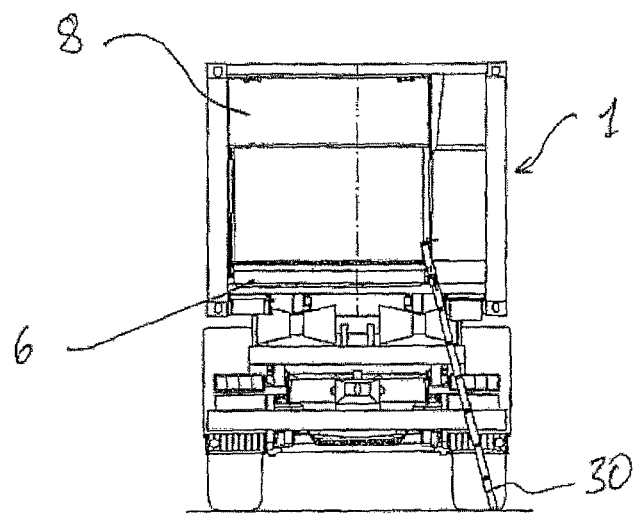

In FIG. 2A through 2C, the work platform 6 is shown in its folded out position. A pneumatic spring 20 simultaneously damps the folding out movement of the work platform 6 and facilitates folding it in. In this operational position, the work platform 6 forms a platform. An edge area 22 is formed around the perimeter of the work platform 6, forming a rim around the passable working surface 24 (see FIGS. 2B, 4A and 4B) that is high enough that a holding area 26 is created over the working surface, which holds the safety elements 28 depicted in FIG. 2B.

FIG. 4A illustrates the dimensions of the holding area 26 corresponding to the safety elements 28. In the rim zone 23 of the edge area 22, a flexible sealing element 23a is arranged, which, when the work platform 6 is closed, seals the opening in the frame area 23b. The closed position (rest position) of the work platform 6 is indicated by a dotted-dashed line.

In another embodiment (FIG. 4B), the rim zone 23 can also be embodied as a (counter) sealing surface, which rests against a corresponding flexible sealing element 23a' in the frame area 23b' of the opening. In this embodiment, the risk of damage to the flexible sealing element 23a' when the work platform is folded out is decreased.

FIG. 4A also shows the folding safety elements 28, which are located completely within the holding area 26, and which are held in place and fastened in the folded position via securing elements 29a and/or buffer elements 29b, so that they are also accommodated in the holding area when the work platform 6 is folded-in (rest position, see dotted-dashed line).

FIG. 2C also shows a ladder 30, which is suspended from the work platform extending to the ground. The flap 8 is still in its rest position.

Figure 3A:
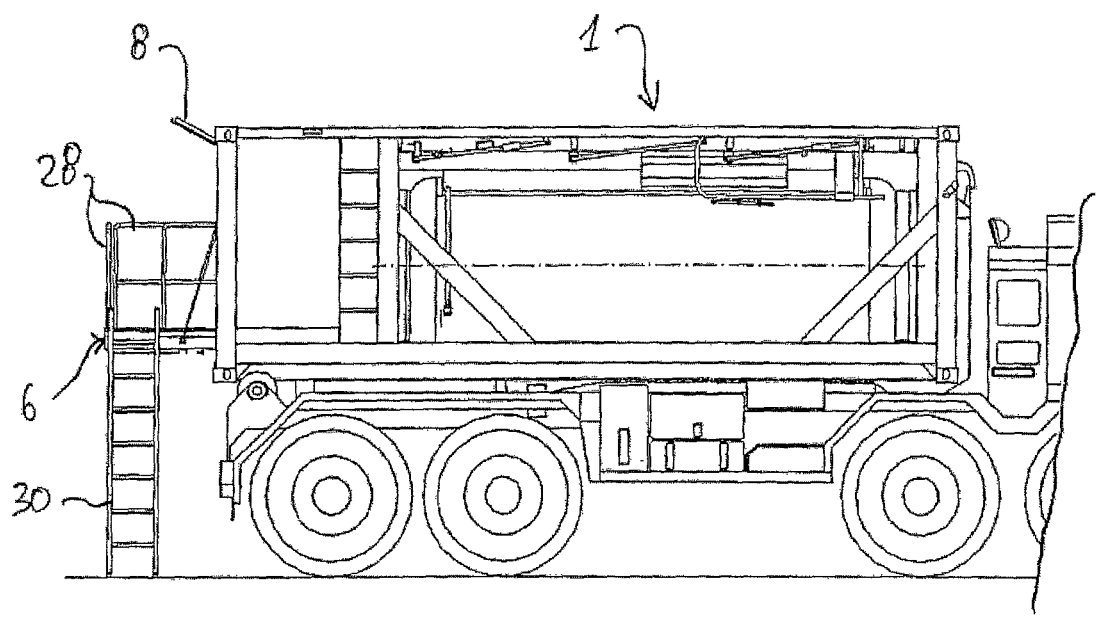
Figure 3B:
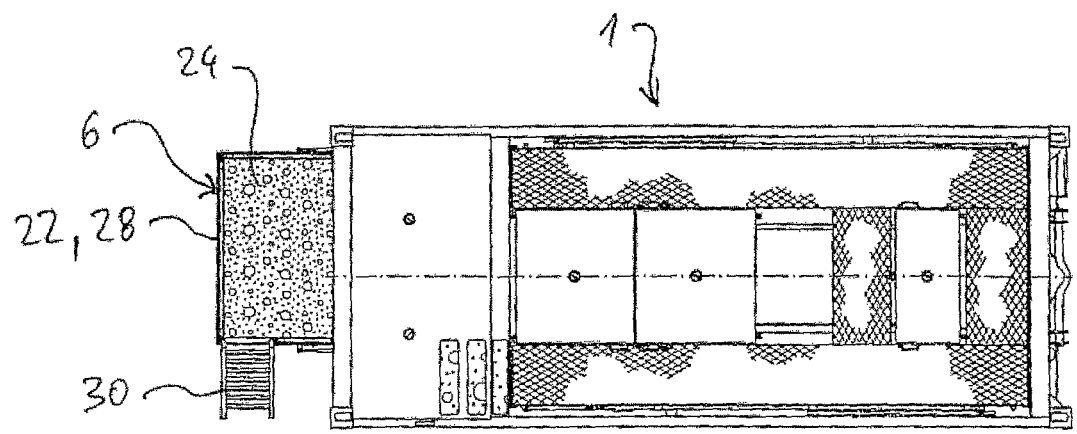
Figure 3C:
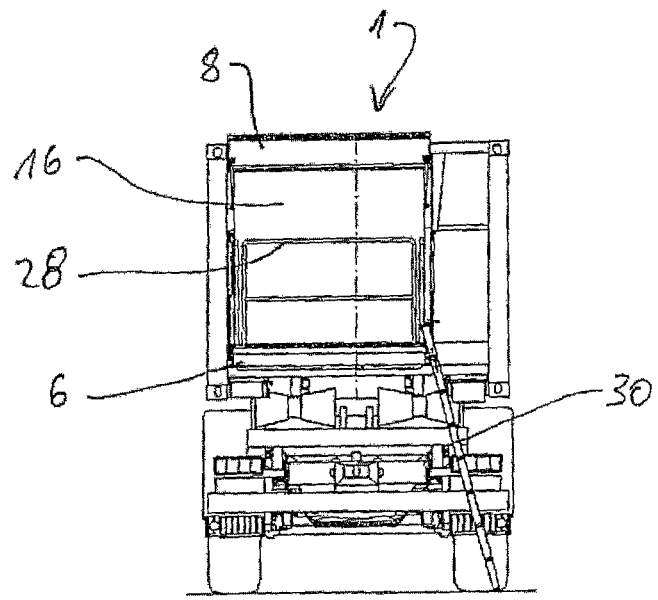

FIG. 3A-3C illustrate the work platform assembly 5, in which all elements 6, 8, 28, 30 are in their operational positions. The flap 8 is also folded out. The safety elements 28 are erected and form a guard rail that surrounds the working surface 24 in the edge area 22, so that the working surface 24 is fully secured. The ladder 30 is attached. The mechanical equipment space 16 is now accessible via a maximum sized, easily accessible opening, and the flap 8 also forms a roof element which provides protection against rain and bad weather.

Figure 5A:
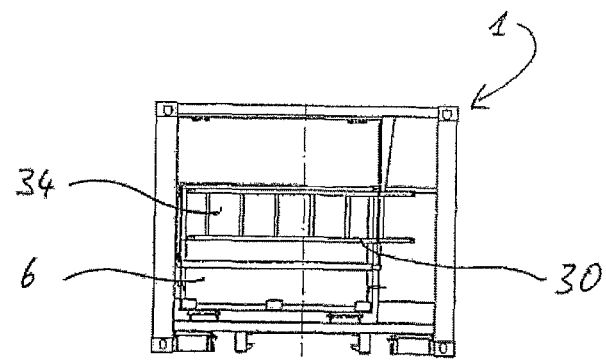
Figure 5B:
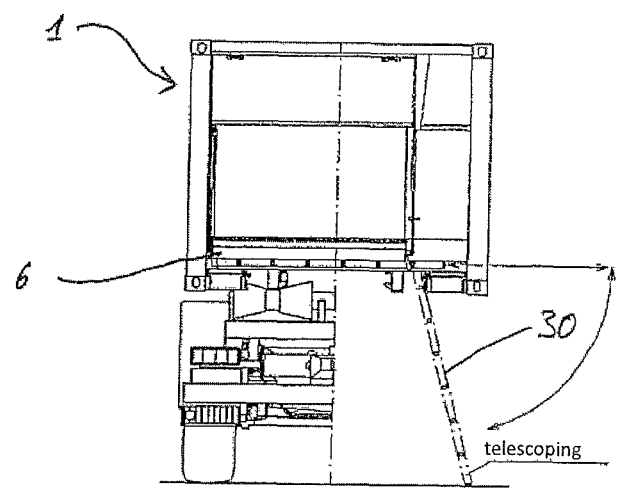

In the above-depicted exemplary embodiment, the ladder 30 is positioned on the side frame of the container 1 when not in use (see FIG. 1A). In another embodiment (FIGS. 5A and 5B) a holding area 34 that is accessible from the outside can also be provided on the work platform 6, wherein the ladder 30, which in this case would also be stowable and/or foldable, can be arranged in such a way that the ladder 30 is positioned completely within the external contours of the container when the work platform 6 is in its rest position (see FIGS. 1A and 1B).

Further embodiments and variations of the present invention result for one of ordinary skill in the art within the scope of the attached claims.

What is claimed is:

1. A work platform assembly for a container comprising an adjustable work platform, which can be adjusted between a horizontal operational position spaced from a ground surface and a vertical rest position, and which is embodied and positioned such that in its rest position it extends completely within the external contours defining a rear end of the container, and in its operational position it forms a horizontal platform, characterized in that the work platform is configured as pivotable, and in its rest position, in which it is vertically arranged, it seals off a corresponding wall area of the container in which the work platform has an edge area which forms an edge at least partially around the perimeter of a passable working area such that the edge area defines a holding area adjacent to the working area, wherein the holding area holds a safety device that can be erected, so that said device extends completely within the edge contours, and is inaccessible from the outside when the work platform is in its rest position.

2. The work platform assembly of claim 1, in which the safety device comprises a folding guard rail element.

3. The work platform assembly of claim 1, in which a rim zone of the edge area is embodied as a sealing element.

4. A work platform assembly for a container comprising an adjustable work platform, which can be adjusted between a horizontal operational position spaced from a ground surface and a vertical rest position, and which is embodied and positioned such that in its rest position it extends completely within the external contours defining a rear end of the container, and in its operational position it forms a horizontal platform, characterized in that the work platform is configured as pivotable, and in its rest position, in which it is vertically arranged, it seals off a corresponding wall area of the container in which a holding area for holding a ladder is formed on the work platform, and is positioned and configured in such a way that when the work platform is in its rest position, a ladder arranged therein extends completely within the external contours of the container and is accessible from the outside.

5. A work platform assembly for a container comprising an adjustable work platform, which can be adjusted between a horizontal operational position spaced from a ground surface and a vertical rest position, and which is embodied and positioned such that in its rest position it extends completely within the external contours defining a rear end of the container, and in its operational position it forms a horizontal platform, characterized in that the work platform is configured as pivotable, and in its rest position, in which it is vertically arranged, it seals off a corresponding wall area of the container in which a flap element is provided, which is capable of pivoting between an operational position and a rest position, wherein the flap element is adjacent to the work platform in its rest position, and closes off a corresponding area adjacent to the work platform, and in its operational position forms a roof element which extends approximately horizontally over the work surface.

6. A work platform assembly for a container comprising:
an adjustable work platform, wherein the work platform is adjustable between a horizontal operational position and a vertical rest position, and wherein the work platform is embodied and positioned such that when in the rest position, the work platform extends completely within the external contours of the container, and when in the operational position, the work platform forms a horizontal platform,
wherein the work platform is configured as pivotable such that, when in the rest position, the work platform seals off a corresponding wall area of the container, and
wherein the work platform has an edge area that forms an edge at least partially around the perimeter of a passable working area such that the edge area defines a holding area adjacent to the working area, wherein the holding area holds a safety device that can be erected, so that said device extends completely within the edge contours, and is inaccessible from the outside when the work platform is in the rest position.

7. The work platform assembly of claim 6, wherein the safety device comprises a folding guard rail element.

8. The work platform assembly of claim 6, wherein a rim zone of the edge area is embodied as a sealing element.

9. The work platform assembly of claim 6, wherein the holding area on the work platform is configured to hold a ladder, and wherein the holding area is positioned and configured in such a way that when the work platform is in the rest position, the ladder arranged in the holding area extends completely within the external contours of the container and is accessible from the outside.

10. The work platform assembly of claim 6, further comprising a flap element capable of pivoting between an operational position and a rest position, wherein the flap element is adjacent to the work platform in the rest position of the flap element and closes off a corresponding area adjacent to the work platform, and when the flap element is in the operational position of the flap element, the flap element forms a roof element that extends approximately horizontally over the work surface.

11. The work platform assembly of claim 10, wherein spring elements affix the flap element in the respective operational or rest position of the flap element and are configured to support manual adjustment.

12. The work platform assembly of claim 6, wherein spring elements affix the work platform in the respective operational or rest position and are configured to support manual adjustment.

13. The work platform assembly of claim 12, wherein the spring elements are pneumatic springs.

14. A container assembly comprising a wall area equipped with a work platform assembly, wherein the wall area of the container assembly is located at a rear or front end surface of the container and borders a mechanical equipment space, and wherein the work platform assembly comprises:
an adjustable work platform, wherein the work platform is adjustable between a horizontal operational position and a vertical rest position, and wherein the work platform is embodied and positioned such that when in the rest position, the work platform extends completely within the external contours of the container, and when in the operational position, the work platform forms a horizontal platform,
wherein the work platform is configured as pivotable such that, when in the rest position, the work platform seals off a corresponding wall area of the container, and
wherein the work platform has an edge area that forms an edge at least partially around the perimeter of a passable working area such that the edge area defines a holding area adjacent to the working area, wherein the holding area holds a secured safety device that can be erected, so that said device extends completely within the edge contours, and is inaccessible from the outside when the work platform is in the rest position.

* * * * *